US008035577B2

(12) United States Patent
Lafarre et al.

(10) Patent No.: US 8,035,577 B2
(45) Date of Patent: Oct. 11, 2011

(54) WRAP DISPLAY SYSTEM HAVING A FLEXIBLE DISPLAY

(75) Inventors: Raymond W. Lafarre, Eindhoven (NL); David J. E. Bemelmans, Eindhoven (NL); Piet C. J. Van Rens, Eindhoven (NL)

(73) Assignee: Creator Technology B.V., Breda (NL)

( * ) Notice: Subject to any disclaimer, the term of this patent is extended or adjusted under 35 U.S.C. 154(b) by 971 days.

(21) Appl. No.: 11/816,067

(22) PCT Filed: Feb. 8, 2006

(86) PCT No.: PCT/IB2006/050413

§ 371 (c)(1), (2), (4) Date: Nov. 30, 2007

(87) PCT Pub. No.: WO2006/085271

PCT Pub. Date: Aug. 17, 2006

(65) Prior Publication Data

US 2008/0204367 A1 Aug. 28, 2008

Related U.S. Application Data

(60) Provisional application No. 60/652,140, filed on Feb. 11, 2005.

(51) Int. Cl.
*G09G 3/20* (2006.01)

(52) U.S. Cl. ..... 345/55; 248/917; 248/920; 361/679.06; 361/679.21

(58) Field of Classification Search .................. 345/156, 345/169, 87–89, 1.3, 85; 455/566; 40/607.1; 361/681, 679.06, 679.07, 679.21, 679.27; 248/918–924
See application file for complete search history.

(56) References Cited

U.S. PATENT DOCUMENTS

| | | | | | |
|---|---|---|---|---|---|
| 2,175,926 | A * | 10/1939 | Smith | ............................. | 40/518 |
| 5,072,956 | A * | 12/1991 | Tannehill et al. | ........ | 280/33.992 |
| 6,311,076 | B1 * | 10/2001 | Peuhu et al. | .................. | 455/566 |
| 7,184,086 | B2 * | 2/2007 | Tamura | .................... | 348/333.06 |
| 7,667,962 | B2 * | 2/2010 | Mullen | .................... | 361/679.56 |
| 2002/0090980 | A1 * | 7/2002 | Wilcox et al. | ................ | 455/566 |
| 2003/0144034 | A1 | 7/2003 | Hack et al. | | |
| 2007/0216639 | A1 * | 9/2007 | LaFarre et al. | ................ | 345/107 |

FOREIGN PATENT DOCUMENTS

| | | | |
|---|---|---|---|
| EP | 0 888 005 | A2 | 12/1998 |
| JP | 2004176473 | A * | 6/2004 |
| WO | WO 99/59101 | | 11/1999 |
| WO | WO 03/050963 | A1 | 6/2003 |

OTHER PUBLICATIONS

International Search Report for PCT/IB2006/050413, dated Sep. 6, 2006.

* cited by examiner

*Primary Examiner* — Amare Mengistu
*Assistant Examiner* — Koosha Sharifi-Tafreshi

(57) ABSTRACT

A wrap display system employs a stick (40, 50), and a flexible unit display (20, 120) having an integration of a flexible display (21) and a display cover (22, 122) that are structurally configured to be wrapped around the stick (40, 50). A holdout mechanism (30) can integrated with the flexible display (21) and the display cover (22, 122) to fix the flexible display (21) in a readable position with respect to the stick (40, 50) in response to the flexible display (21) being unwrapped from the stick (40, 50).

5 Claims, 11 Drawing Sheets

WRAP DISPLAY SYSTEM HAVING A FLEXIBLE DISPLAY

FIELD OF THE INVENTION

The present invention generally relates to flexible displays. The present invention specifically relates to an efficient incorporation of a flexible display into a display system.

BACKGROUND

Rolling display systems currently employ flexible displays that are rolled into a case for facilitating a storage of the flexible display therein, and unrolled out of the case for facilitating an operation of the flexible display. An example of such a display system disclosed in U.S. Patent Application Publication No. US 2002/0196205A1. Within the case, the flexible display can be wrapped around various display driving components within the case whereby either a rolling radius of the flexible display must be large enough to support immobile display drive components within the case and/or movement among display drive components within the case is required to facilitate the rolling/unrolling of the flexible display. One drawback to this rolling/unrolling approach of the flexible display are the limitations imposed on a construction of an optimal shape of the case with minimal dimensions for purposes of achieving a highest degree of portability of the case at minimal cost. The display industry is therefore continually striving to improve upon an incorporation of a flexible display into a display system.

SUMMARY OF THE INVENTION

To this end, the present invention provides new and unique structural forms of a wrap display system having a flexible display that is wrapped around a stick for facilitating a storage of the flexible display and unwrapped from the stick for facilitating an operation of the flexible display. In one form of the present invention, a flexible display unit includes a display cover integrated with the flexible display wherein a section of the display cover is coupled to an external surface of the stick. In a second form of the present invention, a flexible display unit includes a display cover integrated with the flexible display wherein a section of the display cover is permanently wrapped around the stick. In a third form of the present invention, a flexible display unit includes a display cover integrated with the flexible display and a holdout mechanism having an energy stable position for fixing the flexible display in a readable position with respect to the stick when the flexible display is unwrapped from the stick.

BRIEF DESCRIPTION OF THE DRAWINGS

The foregoing forms as well as other, features and advantages of the present invention will become further apparent from the following detailed description of various embodiments of the present invention, read in conjunction with the accompanying drawings. The detailed description and drawings are merely illustrative of the present invention, rather than limiting the scope of the present invention being defined by the appended claims and equivalents thereof.

DETAILED DESCRIPTION OF THE DRAWINGS

One inventive principle of the present invention is to structurally configure a flexible display unit including an integration of a flexible display and a display cover that can be wrapped and unwrapped from around a stick. The present invention does not impose any limitations or restrictions as to the integration of the flexible display and the display cover. Thus, the term "integration" is broadly defined herein as an assembly of the flexible display and the display cover as a single unit, such as, for example, a mounting of the flexible display onto an external surface of the display cover, or a positioning of the flexible display within a multi-layered display cover where the flexible display is viewable through an open window or a transparent window of the display cover.

The present invention also does not impose any limitations or restrictions on the structural configuration and material composition of a flexible display and a display cover of the present invention. In one embodiment, a flexible display of the present invention can be a provided by Polymer Vision, which has a layered flexible display consisting of a back layer of a thin/organic film serving as a base, a middle layer of organic electronics serving as an active matrix for driving the images of the flexible display, and a top layer of an electronic ink printed or otherwise disposed on a plastic sheet.

In practice, the specific implementations of a flexible display unit of the present invention is dependent upon the commercial implementations of the present invention, and are therefore without limit. The following descriptions of FIGS. 1 and 2 provide exemplary embodiments of flexible display units of the present invention incorporating the aforementioned first inventive principle of the present invention.

Figure 1:
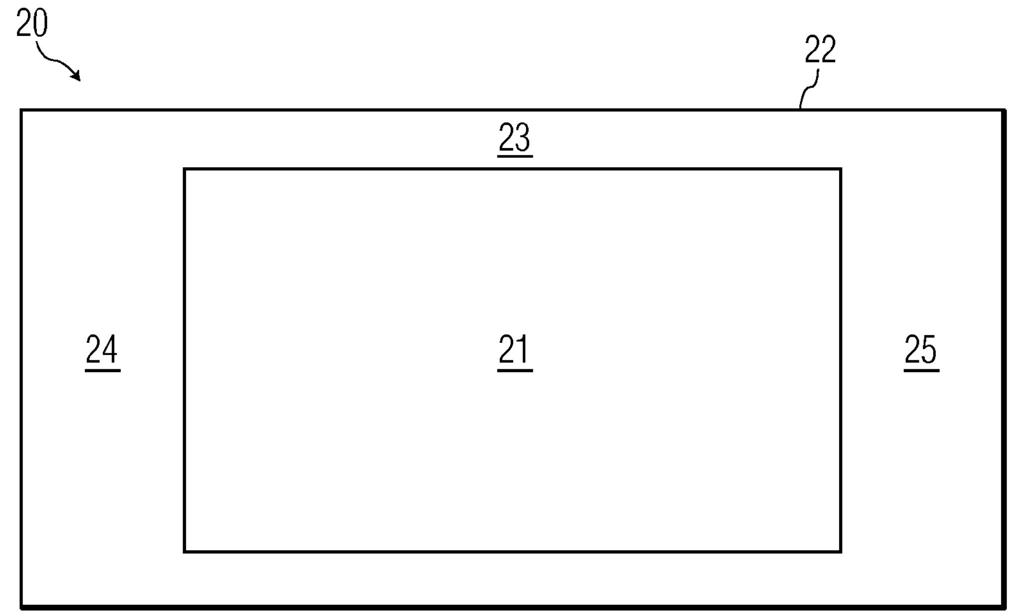
FIG. 1 illustrates a front view of a first embodiment of a flexible display unit in accordance with the present invention without a holdout mechanism.

In one embodiment, as illustrated in FIG. 1, a flexible display unit 20 of the present invention employs a flexible display 21 and a display cover 22 integrated relative to a display section 23 of display cover 22. An attachment section 24 of display cover 22 facilitates an coupling of flexible display unit 20 to a stick in any conventional manner. The dimensions of attachment section 24 can be selected to be less than, equal to or greater than a perimeter of the stick. Additionally, a portion of attachment section 24 can be coupled to an external surface and/or an interface surface of the stick, and/or a portion or an entirety of attachment section 24 can be permanently wrapped around the stick. An optional control section 25 of display cover 22 facilitates a construction of a keyboard or any other type of mechanism for controlling flexible display 21 as needed.

Figure 2:
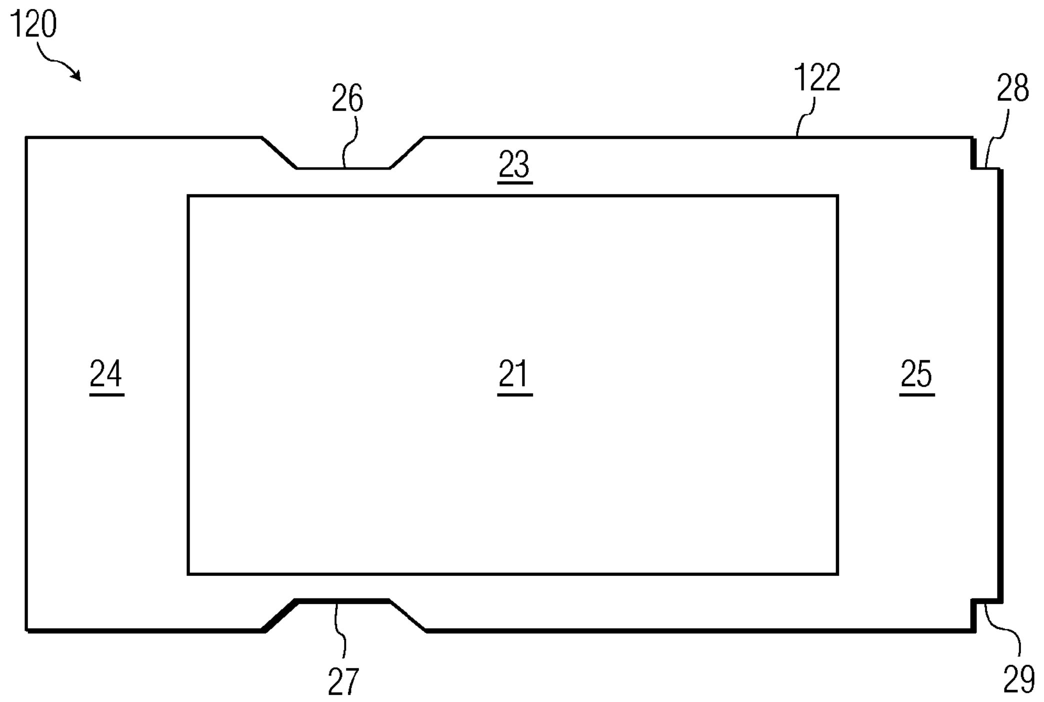
FIG. 2 illustrates a front view of a second embodiment of a flexible display unit in accordance with the present invention without a holdout mechanism.

In a second embodiment, as illustrated in FIG. 2, a flexible display unit 120 includes flexible display 21 and a modification 120 of display cover 22 (FIG. 1) having notches 26-29 for providing an interface with lids of a stick when the flexible display unit 120 is wrapped around particular embodiments of a stick of the present invention having lids as will be subsequently described herein in connection with FIGS. 10 and 11.

A second inventive principle of the present invention is to structurally configure a holdout mechanism having an energy stable position for fixing the flexible display in a readable position with respect to the stick when the flexible display is unwrapped from the stick. Such a holdout mechanism is needed for a flexible display susceptible to curling up when the flexible display is unwrapped from around the stick. The present invention does not impose any limitations or restrictions to the structural configuration and material composition of a holdout mechanism of the present invention. Thus, in practice, the specific implementations of a holdout mechanism of the present invention is dependent upon the commercial implementations of the present invention, and are therefore without limit. The following description of FIG. 3 provides an exemplary embodiment of a holdout mechanism incorporating the aforementioned second inventive principle of the present invention.

Figure 3:
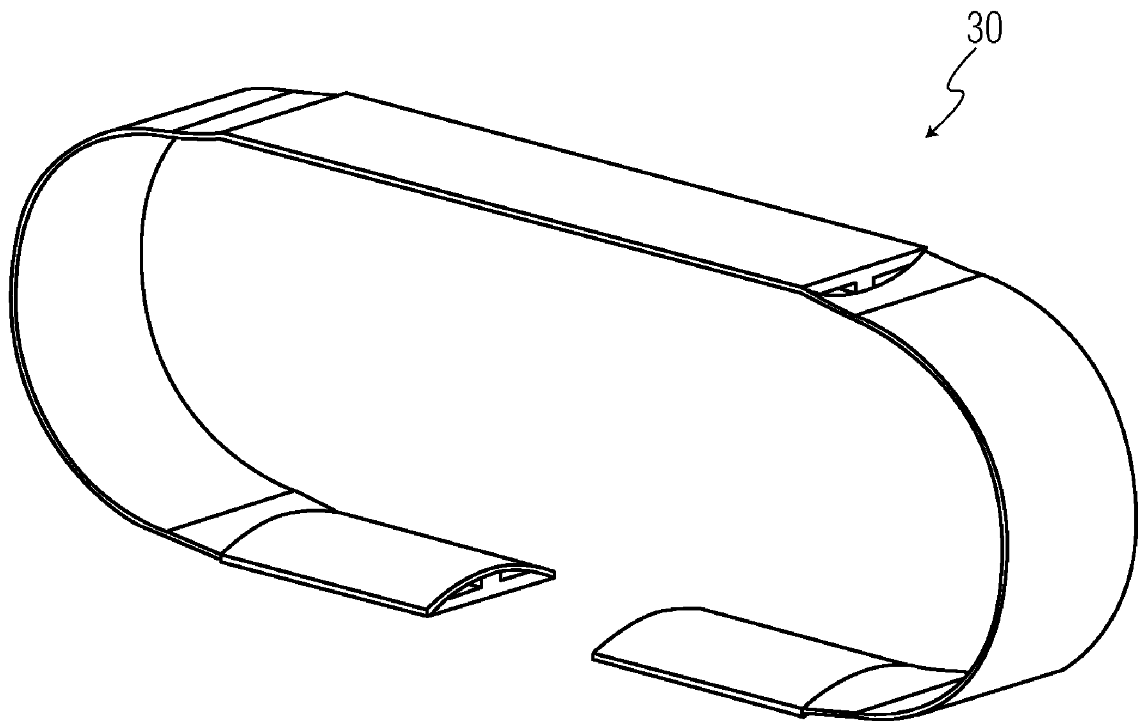
FIG. 3 illustrates a perspective view of one embodiment of holdout mechanism in a rolled up position in accordance with the present invention.

Referring to FIG. 3, the holdout mechanism employs a metal leafspring 30 for fixing a flexible display in a readable position with respect to the stick when the flexible display is unwrapped from the stick. Leafspring 30 has two energetically stable positions, a straight position (not shown) and a rolled up position where it is rolled up at a radius as shown in FIG. 3. Specifically, in the straight position, leafspring 30 can withstand a certain hold force to fix the flexible display in the readable position with respect to the stick. When a force on leafspring 30 exceeds this hold force, leafspring 30 buckles and switches to the rolled up position as illustrated in FIG. 3. To make leafspring 30 with two deformations in the rolled up position, leafspring 30 can be deformed with a radius over its cross-section like the cross section of a spring roll or a gutter, and deformed with a radius over its length by rolling leafspring 30 up like a torsion spring.

Figure 4:
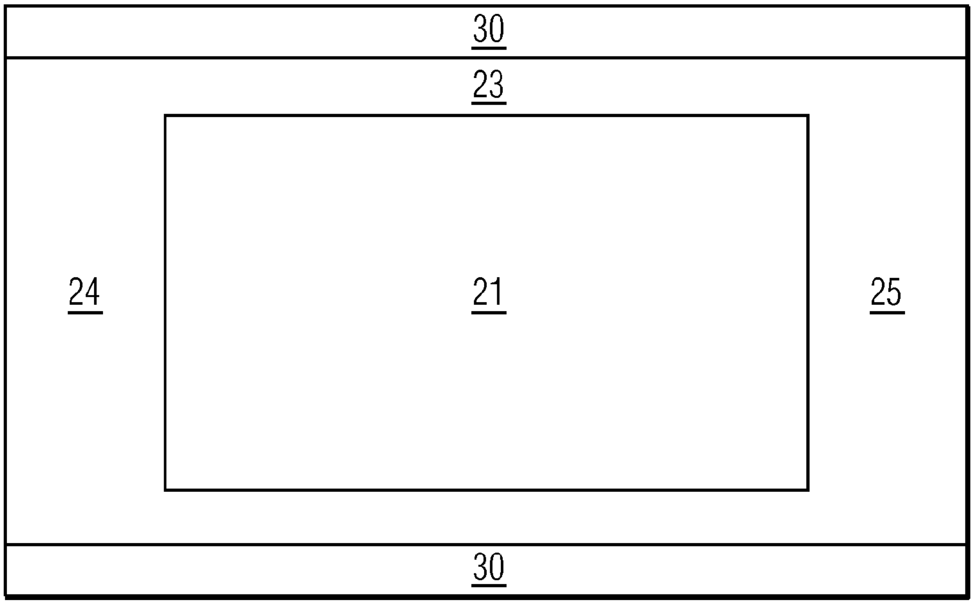
FIG. 4 illustrates a front view of a third embodiment of a flexible display unit in accordance with the present invention with the holdout mechanism illustrated in FIG. 3.

FIG. 4 illustrates an exemplary incorporation of a holdout mechanism within flexible display unit 20 (FIG. 1) wherein the holdout mechanism employs a pair of metal leafsprings 30 attached to display cover 20 along the longitudinal edges of display cover 20. Leafsprings 30 are shown in a straight position for fixing flexible display 21 in a readable position with respect to a stick (not shown) when the flexible display is unwrapped from the stick.

In a second embodiment, the holdout mechanism employs a metal leafspring with only an energetic stable straight position. Thus, in the straight position, the leafspring can withstand a certain hold force to fix the flexible display in the readable position with respect to the stick whereby, when the force on the leafspring exceeds this hold force, the leafspring buckles but does not switch to the rolled up position itself. This type of metal leafspring can be made by deforming the metal leafspring only with a radius over its cross-section like the cross section of a spring roll or a gutter.

Figure 5:
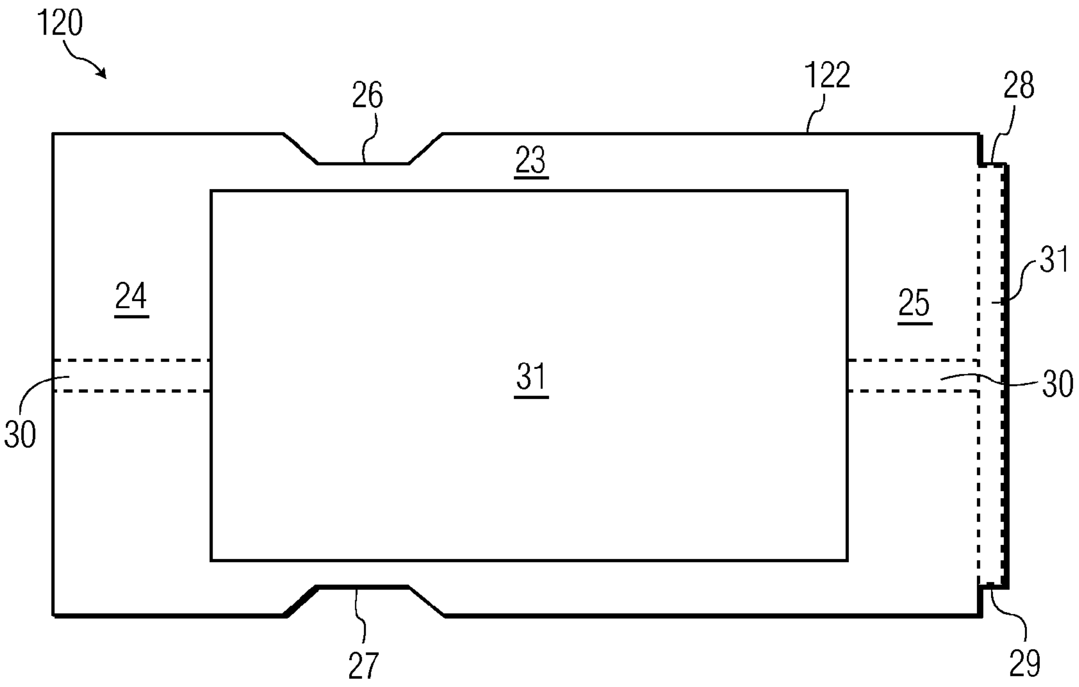
FIG. 5 illustrates a front view of a fourth embodiment of a flexible display unit in accordance with the present invention with the holdout mechanism illustrated in FIG. 3.

In a third embodiment, the holdout mechanism employs a rod spring to concurrently or alternatively apply a force to the flexible display that maintains the flexible display in a flat posture when the flexible display is fixed in a readable position with respect to the stick by one or more leafsprings. FIG. 5 illustrates an exemplary incorporation of a holdout mechanism in flexible display unit 120 (FIG. 2) wherein the rollout holdout mechanism employs a leafspring 30 disposed within display cover 122 along a longitudinal center of display cover 122, and a rod spring 31 connected to leafspring 30 and disposed within display cover 122 along a side edge of display cover 122. Leafspring 30 is shown in a straight position whereby flexible display 21 is fixed in a readable position with respect to the stick with a flat posture supported by rod spring 31.

A third inventive principle of the present invention is to structurally configure a stick to support an optimal structural configuration of its internal components (e.g., driving electronics, connectors, etc.) and its external components (e.g., buttons and interface slots) without requiring any movement of these components upon a wrapping of a flexible display unit (e.g., FIG. 1 and FIG. 2) on the stick or an unwrapping of a flexible display unit from around the stick. The present invention does not impose any limitations or restrictions to the structural configuration and material composition of a stick of the present invention. Thus, in practice, the specific implementations of a stick of the present invention is dependent upon the commercial implementations of the present invention, and are therefore without limit. The following descriptions of FIGS. 6, 7, 10 and 11 provides exemplary embodiments of sticks incorporating the aforementioned third inventive principle of the present invention.

Figure 6:
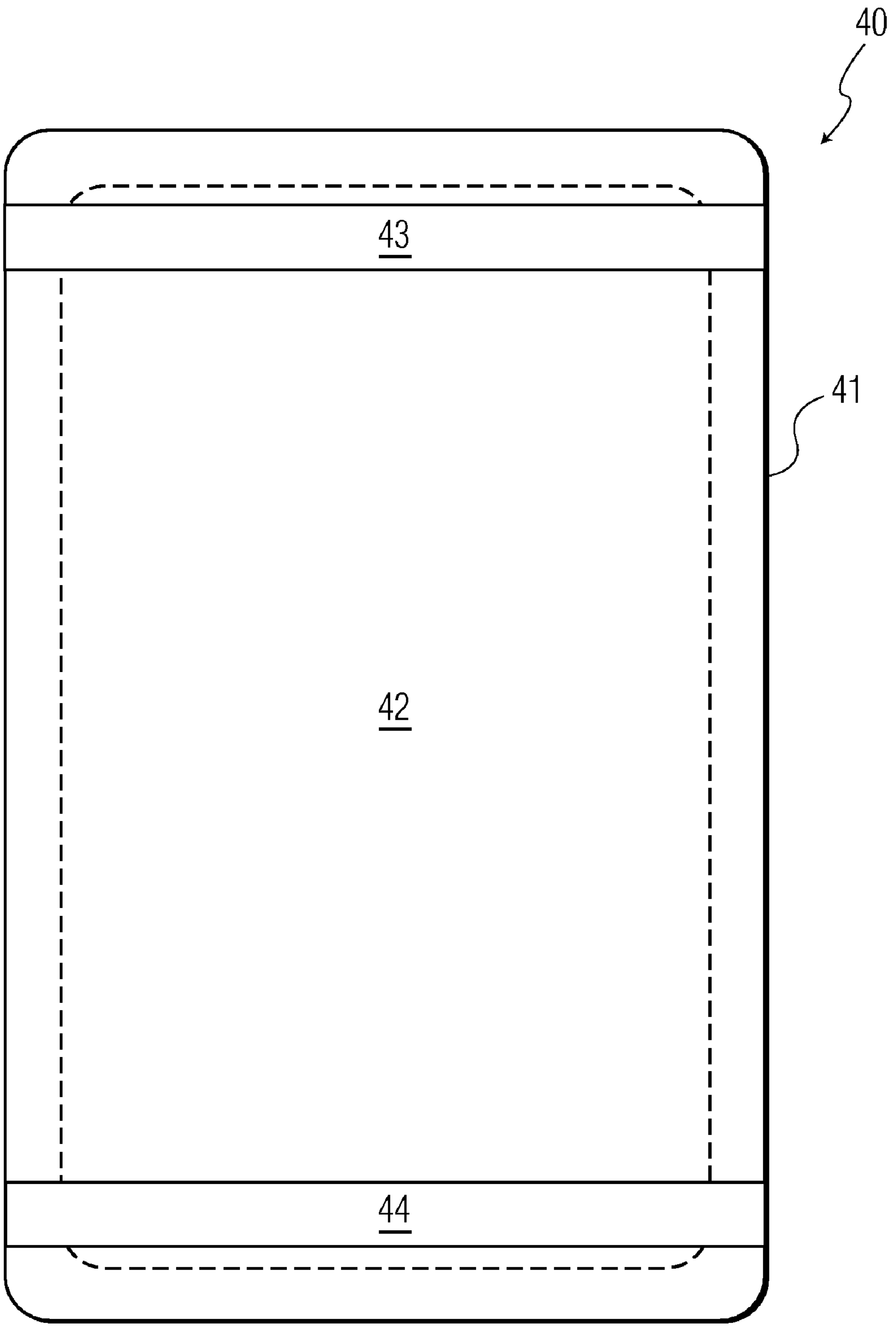
FIGS. 6 and 7 illustrate a front view and a side view, respectively, of a first embodiment of a stick in accordance with the present invention.
Figure 7:
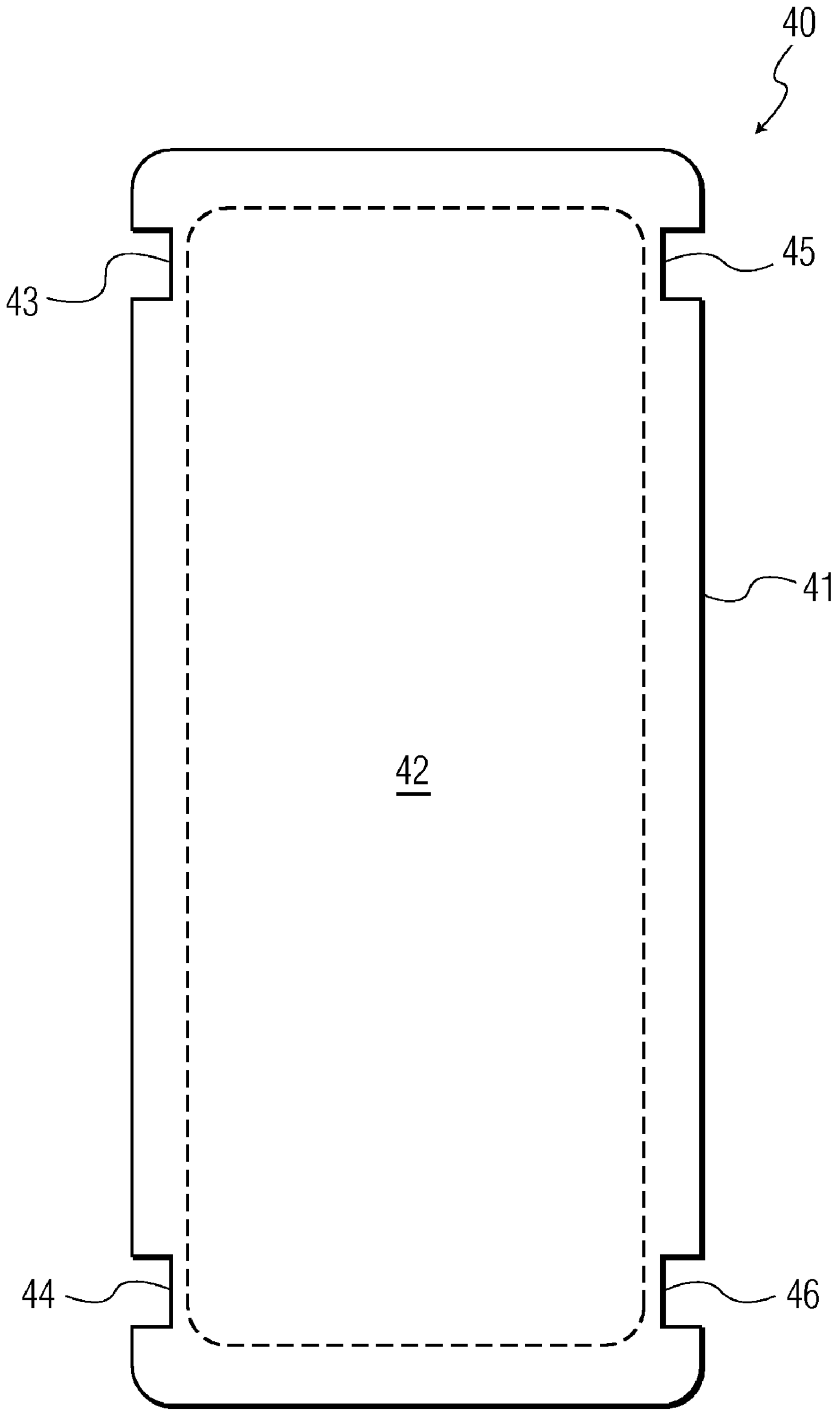
Figure 8:
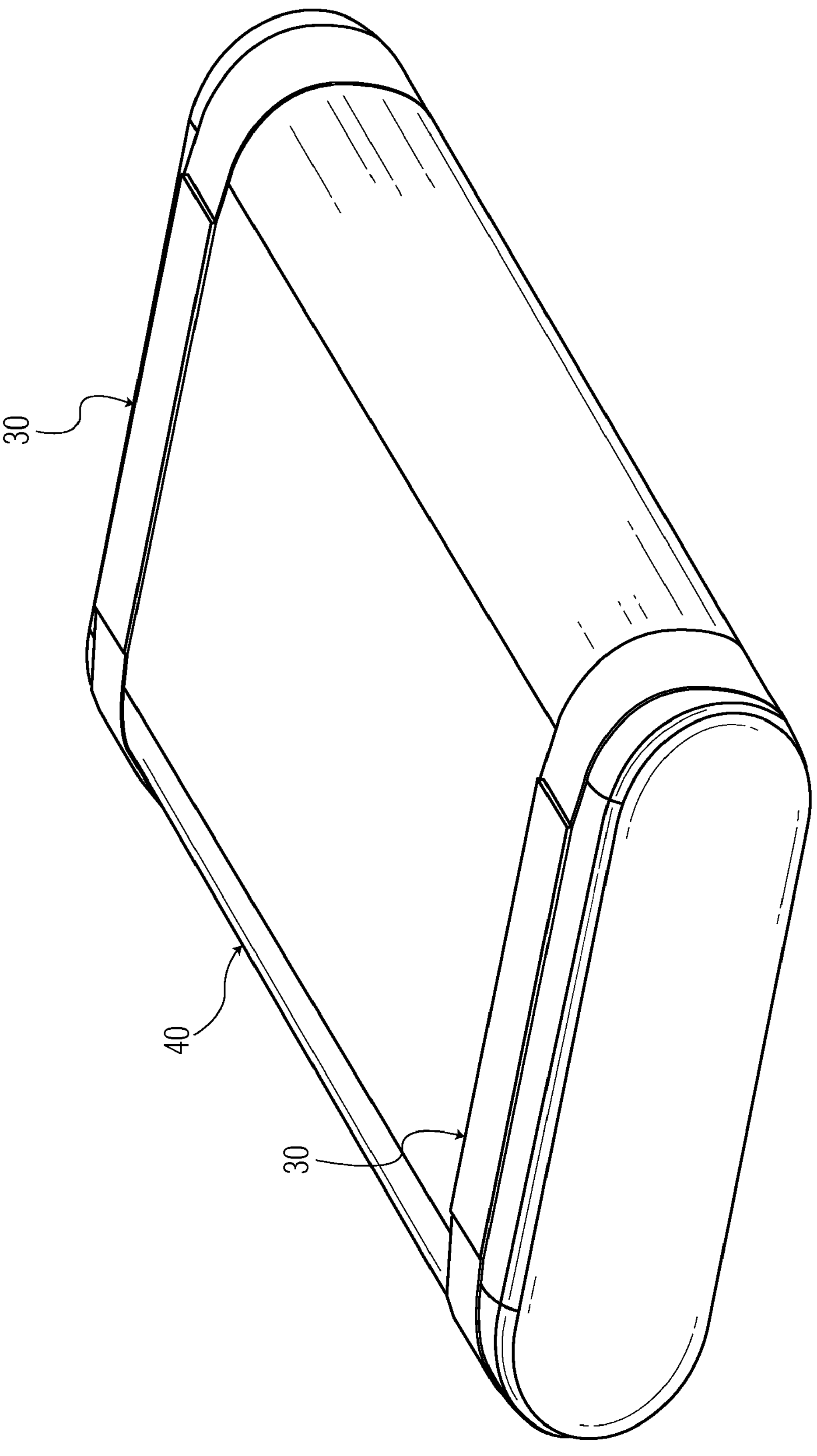
FIG. 8 illustrates a perspective view of the holdout mechanism illustrated in FIG. 3 wrapped around the stick illustrated in FIGS. 6 and 7.
Figure 9:
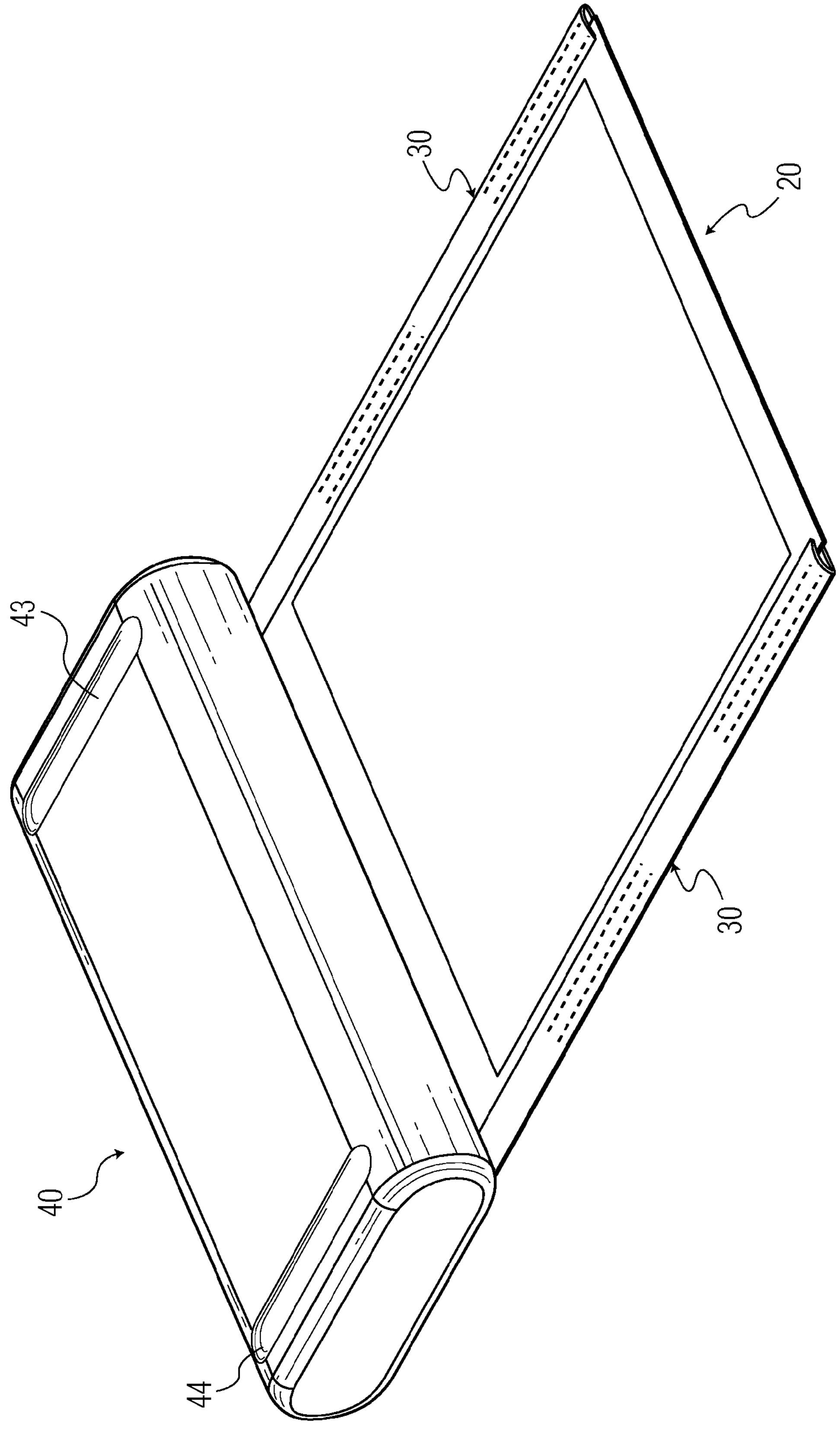
FIG. 9 illustrates a perspective view of a embodiment of a wrap display system in an unwrapped state in accordance with the present invention.

In one embodiment, as illustrated in FIGS. 6 and 7, a stick 40 employs a cylindrical housing 41 defining a cavity 42 therein that facilitates a fixed incorporation of internal components in a standard configuration (e.g., a printed circuit board). A cross-section of cylindrical housing 41 can be circular, elliptical, rectangular with rounded corners, square with rounded corners or any other curvilinear cross-section, and an outside radius of cylindrical housing 41 at any point should not be less than a minimum roll-up radius of a flexible display of the present invention. Additionally, housing 41 can include two or more segments that are separable to facilitate a repair or replacement of any of its internal components. Optional grooves 43-46 are provided on an external surface of housing 41 to seat metal leafsprings (FIG. 4) as illustrated in FIG. 8 whenever flexible unit display 20 or the like is coupled to housing 40 as illustrated in FIG. 9 with the flexible unit display 20 being unwrapped from housing 40.

Figure 10:
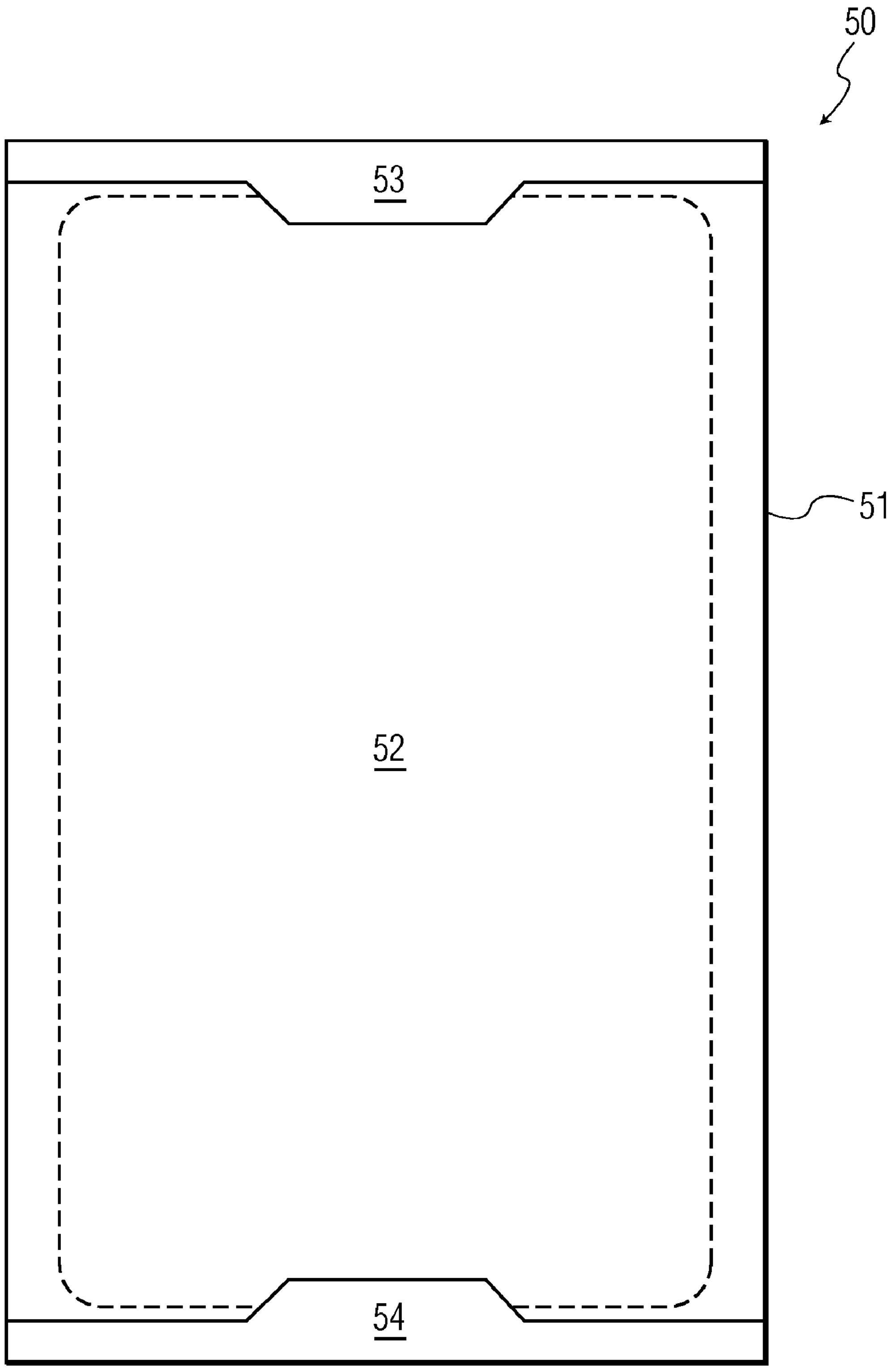
FIGS. 10 and 11 illustrate a front view and a side view, respectively, of a second embodiment of a stick in accordance with the present invention.
Figure 11:
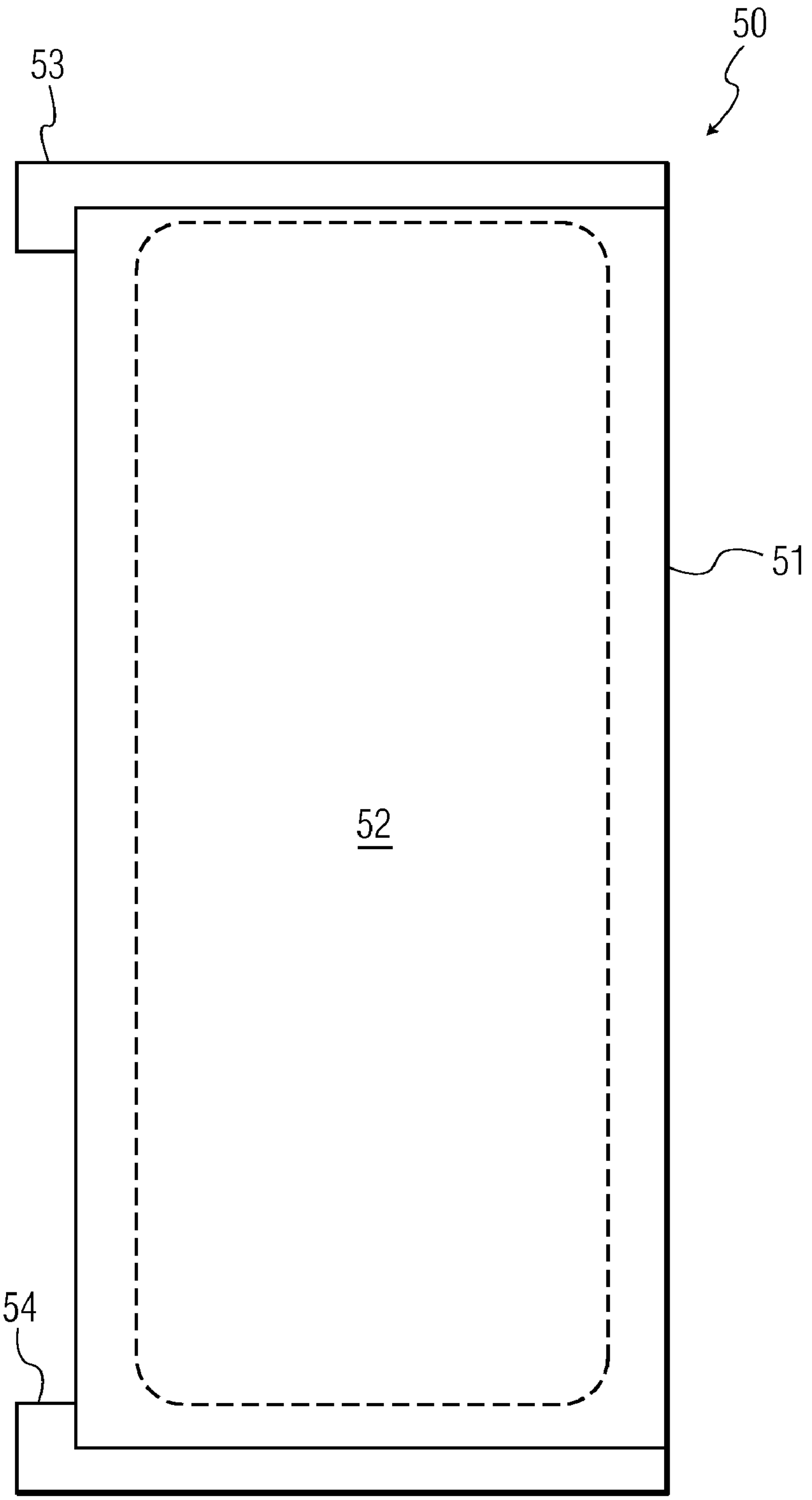
Figure 12:
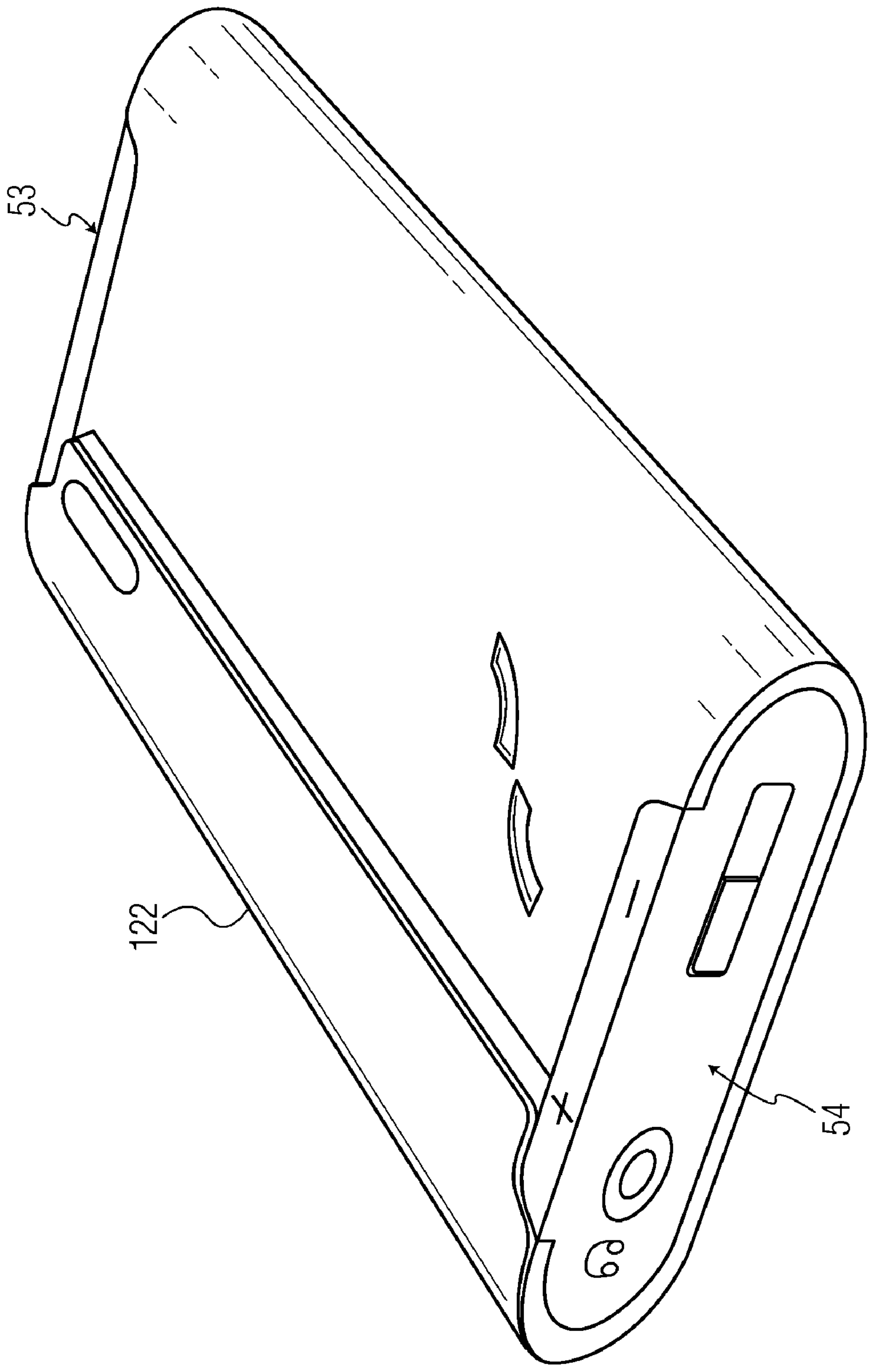
FIGS. 12 and 13 illustrate perspective views of a second embodiment of a wrap display system in a wrapped state and an unwrapped state, respectively, in accordance with the present invention.
Figure 13:
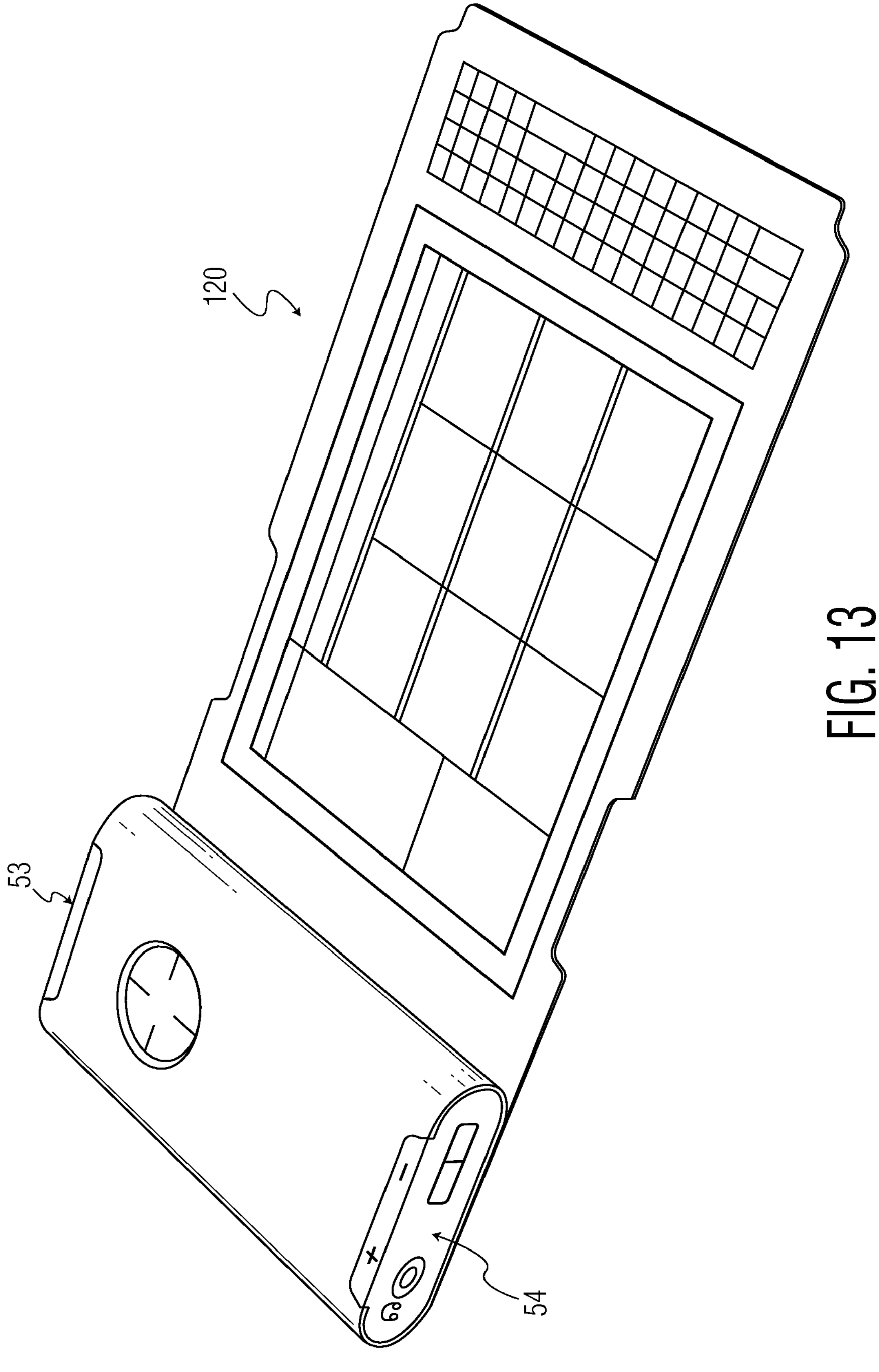

In a second embodiment, as illustrated in FIGS. 10 and 11, a stick 50 employs a tubular housing 51 defining a cavity 52 therein that facilitates a fixed incorporation of internal components in a standard configuration (e.g., a printed circuit board). A cross-section of tubular housing 51 can be circular, elliptical, rectangular with rounded corners, square with rounded corners or any other curvilinear cross-section. Additionally, tubular housing 51 further employs a top lid 53 and a bottom lid 54 for allowing access to cavity 52 to repair or replace its internal components. Lids 53 and 54 further interface with a notches of a display cover of the present invention, such as, for example display cover 122 as illustrated in FIG. 12 when flexible unit display 120 is wrapped around stick 50. Furthermore, housing 51, lids 53 and 54 provide a stable platform to support any necessary buttons and interface slots for interfacing with the internal components of housing 51 particular when a flexible display unit of the present invention is unwrapped from around stick 50, such as, for example, flexible display unit 120 being unwrapped from around stick 50 as illustrated in FIG. 13.

A flexible display unit of the present invention can be locked when wrapped around a stick of the present invention in an conventional manner, such as, for example, by a snap assembly or a Velcro® assembly integrated on a display cover of the present invention.

From the preceding description of the present invention, those having ordinary skill in the art will appreciate various advantages of the present invention. In particular, a construction of an optimal shape of a stick with minimal dimensions for purposes of achieving a highest degree of portability of the stick at minimal cost and with no relative movement among the stick components, internal and external, when a flexible display unit is being wrapped around the stick or unwrapped from around the stick.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A wrap display system, comprising:

a stick; and a flexible display coupled to an external surface of the stick to facilitate a wrapping of the flexible display around the stick for storage and an unwrapping of the flexible display from the stick for facilitating an operation of the display, a holdout mechanism is provided for fixing the display in the operation position;

wherein the flexible display is mounted on a display cover, the display and the cover are configured to be wrapped around the stick to facilitate a wrapping of the flexible display, at least a portion of the display cover is permanently arranged against the stick over at least a part of its perimeter, the holdout mechanism includes at least one metal leaf spring disposed along a side edge of the display cover, the metal leaf spring is seated within a groove of the stick in response to the flexible display being wrapped around the stick, and the groove is formed on an outer surface of the stick.

2. The wrap display system of claim 1, characterized in that the flexible display includes:

a bottom layer including an organic film serving as a base;

a middle layer including organic electronics serving as an active matrix for driving images of the flexible display; and a top layer including an electronic ink disposed on a plastic sheet.

3. The wrap display system of claim 1, characterized in that the mounting of the flexible display on the display cover includes a positioning of the flexible display within the display cover with the flexible display being viewable through a window of the display cover.

4. The wrap display system of claim 1, characterized in that the metal leaf spring enabling an energy stable position for fixing the flexible display in the operational position relative to the stick in response to the flexible display being unwrapped from around the stick.

5. A wrap display of claim 1 in that at least a portion of the display cover is permanently wrapped around the perimeter of the stick to facilitate a wrapping of the flexible display around the stick.

* * * * *